United States Patent
Chamberlain et al.

(10) Patent No.: US 12,356,962 B2
(45) Date of Patent: Jul. 15, 2025

(54) LIVESTOCK WATER HEATER WITH A CONTROLLED COMPOSITION DISPENSER AND RELATED METHOD

(71) Applicants: Matthew Chamberlain, Harrisonburg, VA (US); Christopher Alan Cole, Eagle River, AK (US); Zachary Louis Beatty, Herndon, VA (US)

(72) Inventors: Matthew Chamberlain, Harrisonburg, VA (US); Christopher Alan Cole, Eagle River, AK (US); Zachary Louis Beatty, Herndon, VA (US)

(*) Notice: Subject to any disclaimer, the term of this patent is extended or adjusted under 35 U.S.C. 154(b) by 516 days.

(21) Appl. No.: 17/019,248

(22) Filed: Sep. 12, 2020

(65) Prior Publication Data

US 2021/0076638 A1 Mar. 18, 2021

Related U.S. Application Data

(60) Provisional application No. 62/922,978, filed on Sep. 12, 2019.

(51) Int. Cl.
*A01K 7/02* (2006.01)

(52) U.S. Cl.
CPC ............. *A01K 7/027* (2013.01); *A01K 7/022* (2013.01)

(58) Field of Classification Search
CPC ........... A01K 7/02; A01K 7/022; A01K 7/027
USPC ........................................ 119/72, 73
See application file for complete search history.

(56) References Cited

U.S. PATENT DOCUMENTS

| | | | |
|---|---|---|---|
| 3,221,706 A | 12/1965 | Johnson | |
| 4,440,112 A | 4/1984 | Lilyard | |
| 4,509,460 A * | 4/1985 | Seltzer | A01K 7/02 119/74 |
| 4,532,892 A * | 8/1985 | Kuzara | A01K 11/006 119/51.02 |
| 4,646,687 A * | 3/1987 | Peterson | A01K 7/02 119/73 |
| 4,835,366 A | 5/1989 | Owen et al. | |
| 4,940,667 A * | 7/1990 | Goldstein | G01N 31/12 422/78 |
| 5,052,343 A * | 10/1991 | Sushelnitski | A01K 7/02 119/74 |
| 5,174,245 A * | 12/1992 | Bishop | A01K 7/025 119/73 |
| 5,813,363 A * | 9/1998 | Snelling | A01K 7/027 119/73 |
| 6,497,197 B1 * | 12/2002 | Huisma | A01K 7/02 119/75 |
| 6,866,005 B1 * | 3/2005 | Bunker | A01K 7/00 119/72 |

(Continued)

FOREIGN PATENT DOCUMENTS

| | | | |
|---|---|---|---|
| CN | 206866263 | * | 1/2018 |
| KR | 2015567 | * | 8/2019 |

*Primary Examiner* — David J Parsley
(74) *Attorney, Agent, or Firm* — Breneman & Georges

(57) ABSTRACT

A portable submersible livestock water quality dispensing device and design for a livestock drinking station is provided. The portable submersible livestock water quality dispensing device has a heating element and a variable pressure pump with internal compartments or inserts for accommodating biocides, minerals, vitamins and medicaments and preferably a rotatable circulation device and method for their controlled release and dosing.

20 Claims, 9 Drawing Sheets

(56) References Cited

U.S. PATENT DOCUMENTS

| | | | | |
|---|---|---|---|---|
| 7,007,634 B1* | 3/2006 | Pederson | .................. | A01K 7/04 |
| | | | | 119/78 |
| 7,201,113 B2* | 4/2007 | Harvey | ................... | A01K 7/02 |
| | | | | 119/72 |
| 7,740,025 B2 | 6/2010 | Scaringe | | |
| 7,975,649 B2* | 7/2011 | Barker | ................... | A01K 7/025 |
| | | | | 119/61.55 |
| 8,117,991 B1* | 2/2012 | Civitillo | ................. | A01K 7/027 |
| | | | | 119/72 |
| 8,146,535 B1* | 4/2012 | Neumann | .............. | A01K 7/027 |
| | | | | 119/72 |
| 8,651,065 B1* | 2/2014 | Eash | ...................... | A01K 7/027 |
| | | | | 126/344 |
| 8,747,075 B1* | 6/2014 | Gandini | .............. | A01K 63/047 |
| | | | | 417/39 |
| 11,448,544 B2 | 9/2022 | Salib | | |
| 2005/0051199 A1* | 3/2005 | Drago | .................... | A47L 15/46 |
| | | | | 134/99.1 |
| 2009/0047008 A1 | 2/2009 | Straley | | |
| 2009/0151801 A1* | 6/2009 | Gorman | .............. | F04D 15/0066 |
| | | | | 318/434 |
| 2015/0150215 A1* | 6/2015 | Pumphrey | ................ | A01K 7/04 |
| | | | | 119/73 |
| 2015/0189856 A1* | 7/2015 | Alexander | ............. | A01K 39/02 |
| | | | | 119/74 |
| 2018/0229280 A1* | 8/2018 | Reed | ......................... | B08B 9/34 |
| 2018/0319650 A1* | 11/2018 | Henriquez | ........... | B67D 1/1202 |

\* cited by examiner

LIVESTOCK WATER HEATER WITH A CONTROLLED COMPOSITION DISPENSER AND RELATED METHOD

CROSS REFERENCE TO RELATED APPLICATIONS

This application is related to and is entitled to priority based on the subject matter of U.S. Provisional Application Ser. No. 62/992,978 filed Sep. 12, 2019 entitled Livestock Water Heater And Design With A Controlled Biocide Dispenser And Related Method.

COPYRIGHT/TRADEMARK NOTICE

This document includes subject matter that is also subject to U.S. and International copyright and trademark protection. The copyright and trademark owner grants permission to copy this document in the U.S. Patent and Trademark Office as well as in corresponding foreign patent offices but reserves all rights to its trademark, software, data and displays described herein and included in the appended drawings. Copyright © BCCM Farm Innovations LLC.

BACKGROUND OF THE INVENTION

1. Field of the Invention

The invention pertains to a novel portable device, design and related method for preventing livestock water from freezing while maintaining the potability or quality of the drinking water. The novel device includes a heating element together with a pump and a processor that provides the controlled release of a composition such as a nutrient, medicament or a biocide that maintains livestock water at a desired condition for dispensing water as well as the controlled release of vitamins, minerals and various types of medicinal preparations to livestock.

2. Description of the Prior Art

Livestock require water at varying conditions throughout the year. In cold weather freezing is the primary concern and the prior art has provided electric water heaters such as described in Staley U.S. Pub 2009/0047008 and Owen, et al U.S. Pat. No. 4,835,366. Such water heaters alone do not address the problem of controlling water quality by employing a combination of not only a heating element but also a circulation pump to work in conjunction with each other and a controlled release of a medicine, nutrient, mineral or biocide to maintain water quality by responding to herd requirements and seasonal climate changes. Moreover, the prior art has not provided sufficient control over temperature, water pressure and circulation, in relation to water quality to allow the controlled release of vitamins, minerals, nutrients and even medicinal preparations into livestock water.

Additional prior art such as Johnson U.S. Pat. No. 3,221,706; Lilyerd U.S. Pat. No. 4,440,112 and Sushelnitski U.S. Pat. No. 5,052,343 provides a pump and pump nozzles but does not provide a heating element to prevent water from freezing. Such prior art is not portable and requires expensive modifications of existing livestock water dispensers. Such prior art also does not provide for the controlled release of a composition or a biocide to maintain the quality of the dispensed water or provide the precise control needed to dispense nutrients, vitamins, minerals and other medicinal or nutritional agents.

Other prior art such as a JMU or JMI Provisional Patent Application 62/862,880 dated Jun. 18, 2019 now U.S. Pat. No. 11,448,544 was worked on by Matthew Chamberlain, a co-inventor of the present invention. U.S. Pat. No. 11,448,544 discloses a water trough monitoring system that includes temperature sensors and water flow sensors in a submersible device with a pump connected to an above ground communications device that provides a wireless communications link to a farmer, rancher or user. Essentially most of the components in U.S. Pat. No. 11,448,544 are above ground as a communications system optimized for remote and rural environments and did nothing with heating water or dealing with water freezing. Unlike the invention U.S. Pat. No. 11,448,544 does not have a portable submersible device designed to save energy in the field that has an internal cavity divided into at least one water tight compartment to house a variety of electro mechanical components and a water permeable compartment to accommodate compositions to add nutrients, medicaments and other compounds to alter or maintain and monitor the quality of the water. The present invention unlike U.S. Pat. No. 11,448,544 is more than a monitoring system as it provides a real time alert of conditions that cannot are not accommodated by the U.S. Pat. No. 11,448,544 prior art.

Other prior art has provided for methods and apparatus for the time release of biocide tablets or liquid biocides to prevent bioorganic growth. Such prior art as Scaringe U.S. Pat. No. 7,740,025 provide for the gradual release of biocides and algicides for purposes other than maintaining the quality of livestock water. Such prior art does not provide temperature control together with pressure control and a processor and a two way communication with the device and a processor and a two way communication with the device to provide a precise control over the release of a biocide, algicide nutrient, mineral, vitamin or medicine to be sufficiently controlled to maintain water quality and support the delivery of medicaments to livestock.

A need exists for an energy efficient device that controls both temperature and pump pressure to prevent freezing and provide first for the selection of the degree of circulation necessary to prevent freezing and then adding heat when necessary when in the energy saving environmental mode. When freezing is not the primary concern and the dispensing and controlled release of a nutrient, biocide, medicament or compound is the primary concern due to solubility as a result of either water temperature or water rate of circulation or both can be varied to provide maximum efficiency.

A need exists also for a lightweight inexpensive universally compatible portable device with an external battery that is capable of not only from preventing livestock water from freezing but that is also capable of maintaining the quality of dispensed water and communicating conditions remotely to a farmer or rancher. The need includes a device that is capable of precise control of temperature and pressure to not only prevent water from freezing but also to control the dispensing of biocides and vitamins, minerals and nutrients including medicaments with the livestock water together with a monitoring system to control the amount of biocides, vitamins, minerals, nutrients and medicaments consumed at any one time by any one animal.

SUMMARY OF THE INVENTION

The invention provides a light weight portable and energy efficient water quality control device that not only prevents water from freezing but also works to maintain water quality as well as if desired the controlled release of a bioside or a medicament. The novel device includes a heater preferably with a variable temperature control and a pump preferably with a variable pressure control for delivering water to a plurality of nozzles on a removable and replaceable water circulation component as well as a processor and preferably a communications link. The water circulation device or component is preferably detachably mounted to the body of the water control device to accommodate existing water troughs of various configurations merely by changing the water circulation component or device and optionally may be battery operated.

The combination of temperature and pressure control allows the novel device to provide the efficient use of energy that is particularly important in battery operated devices by controlling pump pressure first and then temperature to maintain the degree of circulation necessary to prevent freezing and use heat only when required. The control of temperature and pressure provide a circulation of water that assists in providing a controlled release of a bioside such as an algicide to remove microbes from livestock water or add beneficial microbes at beneficial temperature and water conditions while monitoring and providing a two way communication of water quality and condition. The temperature and water pressure variables also assist in the controlled or timed release of minerals such as zinc, copper and silver which are known as effective agents against viruses and bacteria.

The precise control of temperature and pressure also provides for the controlled release of nutrients, vitamins and even medicinal preparations particularly when a monitoring device is coupled with an electronic device in accordance with a preferred embodiment of the invention. This is particularly advantageous where the entire herd requires one or more vitamins, nutrients and medicine and the amount of dispensed compound is not critical. However, even in cases where the amount of medicine dispensed is critical the water dispenser can be coupled in accordance with the invention with a camera or other sensor to determine the amount of water consumed and be coupled to a device that shuts off the flow of water or forces the animal away from the dispenser.

In the preferred embodiment the novel dispenser is of a circular or cylindrical configuration even though other configurations such as rectangular, spherical, oblong or other shapes can be employed. The circular dispenser is designed to have a top cover or portion and a bottom cover or portion that are designed to screw or snap together and when connected house a heater, a pump, a thermostat and electrical components to operate and in the preferred embodiment accept commands remotely to provide variable control over the pump and temperature output of the heating element. In a further preferred embodiment of the invention a two way communications link is provided between the novel dispenser and a cellphone for a direct and immediate control/ response. The water pump preferably provides an output of 100 to 2000 GPH and in the most preferred embodiment 300 GPH-1000 GPH (gallons per hour) and preferably is a variable output pump controlled by a timer, computer program or a remote controller through a wire or wires connected to the power cord. Similarly the heating element has a 50 W-150 W (Watt) output or greater which can also be controlled remotely by a controller or with a timer or a computer program or software in a control unit connected to the power cord.

The water pump communicates with a circulation device having a plurality of nozzles which may be rectangular, circular or a polygonal shape and may have two or more arms and preferably 6 arms disposed on a lid attached to the bottom cover or top cover. The arms may be detachably mounted by threads or a bayonet and slot fitting or other fasteners known to those skilled in the art. In some embodiments of the invention the arms of the circulation device may be fixed to the detachable mounting structure or rotatably mounted. The arms may be straight or curved axially or radially or both to assist in the circulation of water in the existing livestock water trough.

Inside the novel dispenser housing in addition to the pump and heater are inserts or containers for biocides or algicide which may be commercially obtained or be an available organic material such as barley or other organic substances as well as filters. The inside of the novel dispenser also includes a plurality of smaller components for containing vitamins, nutrients, minerals and soluble medicaments which are then dispensed with the livestock water under a temperature and pressure controlled environment.

In one embodiment of the invention the novel housing includes a water intake communicating with the pump through one or more openings in the novel submersible dispenser. The water intake can be one or more holes in the top or in the sides of the novel submersible dispenser which in the preferred embodiment are disposed around the perimeter of the dispenser. The intake of the water pump may be through a tube disposed on the bottom or around the sides of the housing to provide a circulatory water pattern inside the housing while circulation device provides a water circulation pattern outside the device.

The novel method includes the utilization of a heating element preferably with a variable heat output in combination with a pump having a variable discharge pressure in combination with a biocide or soluble nutrient, vitamin, mineral or medicament and introducing the soluble biocide, algicide, nutrient, vitamin, mineral or medicament in livestock water based on water temperature and pump pressure. The method includes the wireless control of the pump pressure and/or temperature of the heating element and wireless monitoring or control of the novel device.

These and other advantages will be apparent to those skilled in the art by referring to the drawings. The drawings are for illustrative purposes only as changes may be made in construction, appearance and physical size, shape and layout of the internal components and external appearance within the teachings of this invention.

BRIEF DESCRIPTION OF THE DRAWINGS

The following drawings are for purposes of illustration without limiting the scope of the invention, in which.

DETAILED DESCRIPTION OF THE INVENTION

Figure 1:
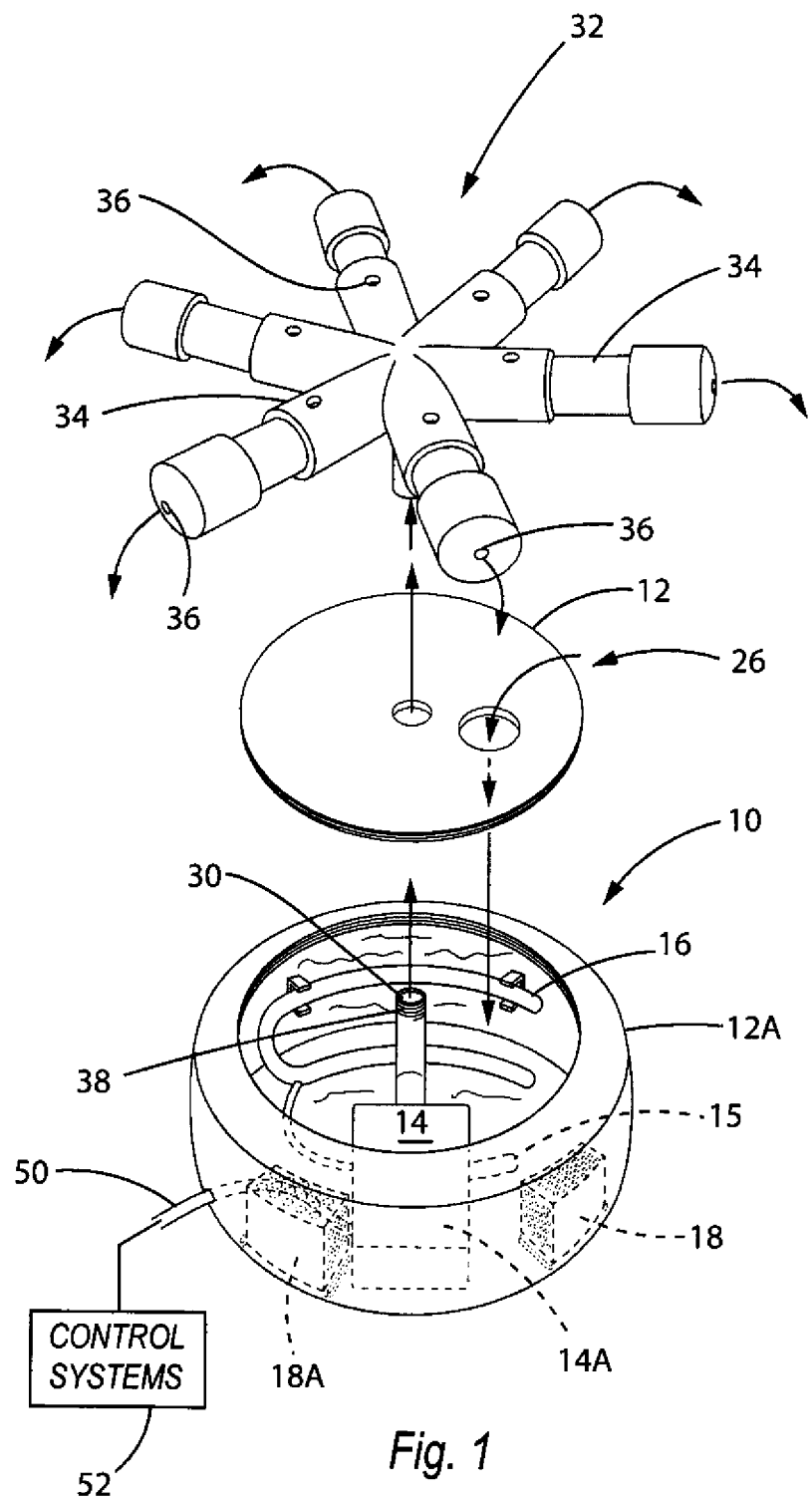
FIG. 1 is a perspective exploded view of the novel portable water device.
Figure 1A:
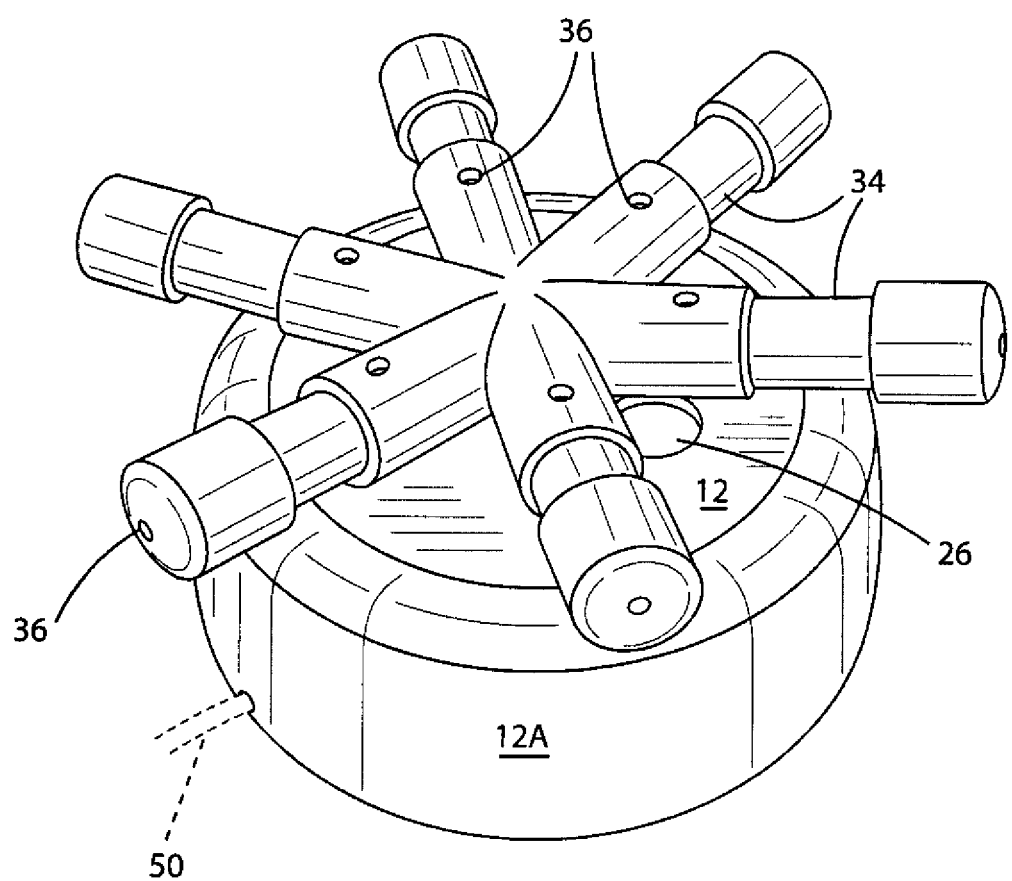
FIG. 1A is an assembled perspective view of FIG. 1.
Figure 1B:
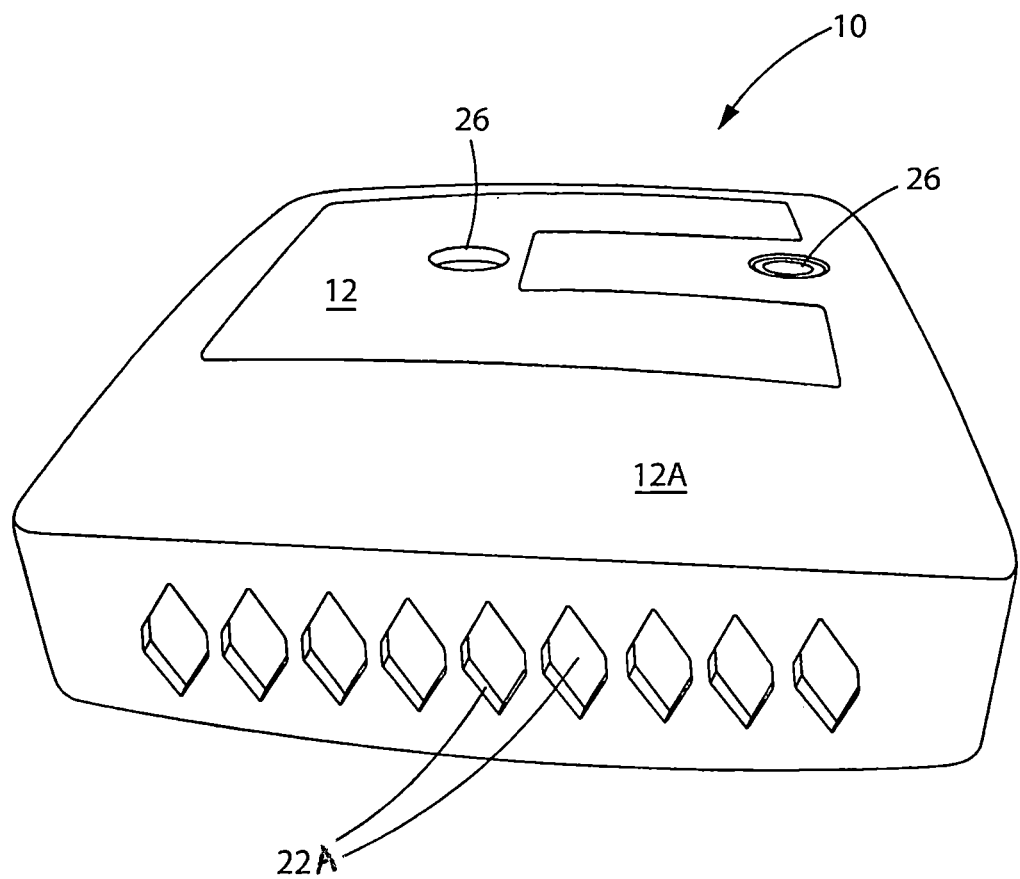
FIG. 1B is a perspective alternative embodiment of the novel portable water device.
Figure 1C:
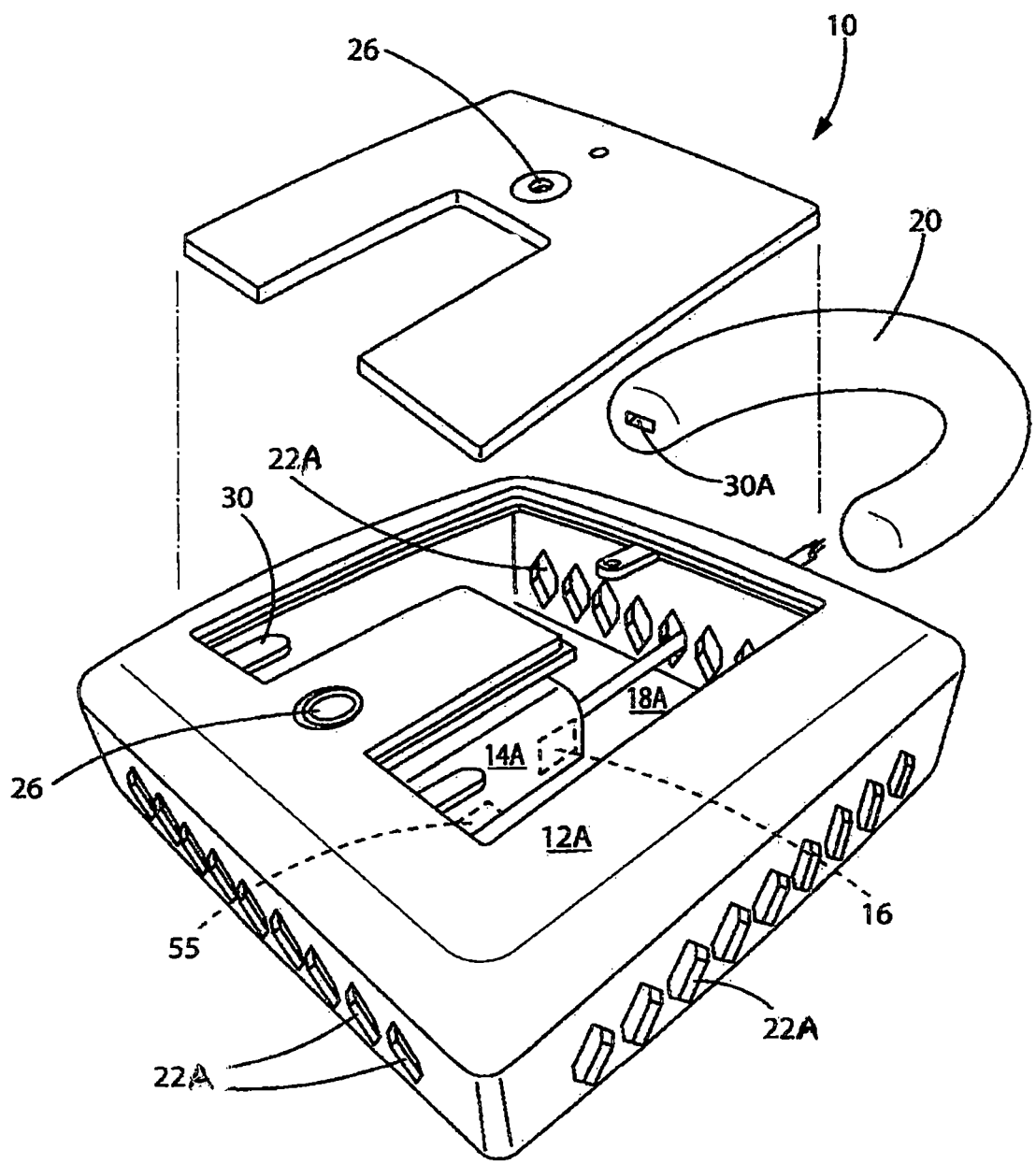
FIG. 1C is an exploded perspective view of the alternative embodiment of FIG. 1B.

Referring now to FIGS. 1, 1A, 1B, 1C and 1D the novel submersible livestock dispenser 10 having a heater with a biocide dispenser preferably has a two component housing with a lid or top 12 and a bottom 12A that accommodates a water tight housing and a variable speed or pressure pump 14 and electrical circuitry for a heating element 16 and at least one insert or open compartment 18, 18A for holding a water soluble composition 20 (FIGS. 1C and 4) which may be a biocide, vitamin, mineral or medicament that can be dispensed with the livestock drinking water. The dispenser 10 includes one or more openings 22 (FIGS. 1B, 4, 5) which when placed inside a common livestock water trough 40 or an individual animal plenum 24 (FIG. 7) supplies circulating water in trough 40 and back to an intake 26 which may be on the lid or top 12 or on the bottom 12A or both. Water taken into water tight case and pump 14 through a tube 15 results in internal water circulation pattern by pump 14 both of which contribute to dissolving water soluble composition 20 in insert or open compartment 18 with heating element 16. In FIG. 1C the water soluble composition 20 housed in its own housing and has an opening 30A that connects to outlet 30. As will be recognized from FIG. 1 and FIG. 1C the novel submersible dispenser contains two types of compartments namely an open area to accommodate a heating element 16 as illustrated in FIG. 1 with electrical control systems 52 outside dispenser 10 or with the electrical control system 52 inside a water tight compartment 18A inside dispenser 10. In FIG. 1C a water tight compartment 14A is provided for housing a pump and a heater as well as optional components such as a wireless receiver or transceiver, battery and computer processors and electrical components while compartment 18A can house water soluble compositions as well as optional water quality testing components that communicate with computer processors inside water tight compartment 14 FIG. 4 or 14A in FIG. 1C.

Figure 1D:
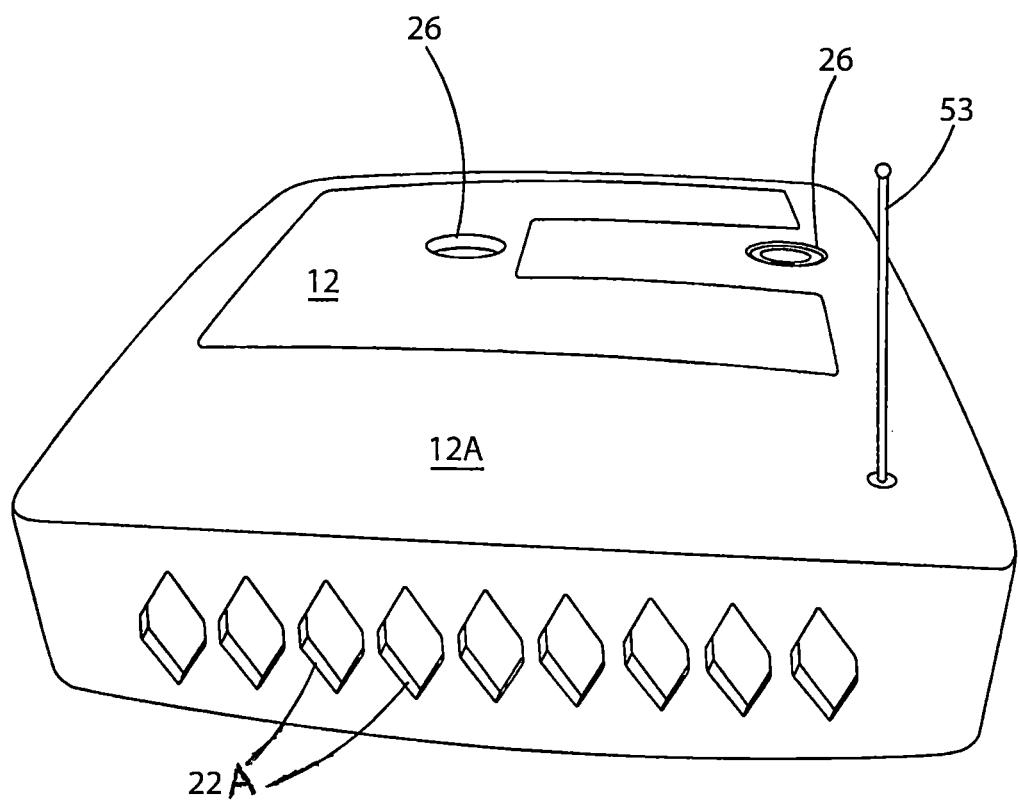
FIG. 1D is a perspective view of the alternative embodiment of FIG. 1B with a wireless two way communications antenna.
Figure 4:
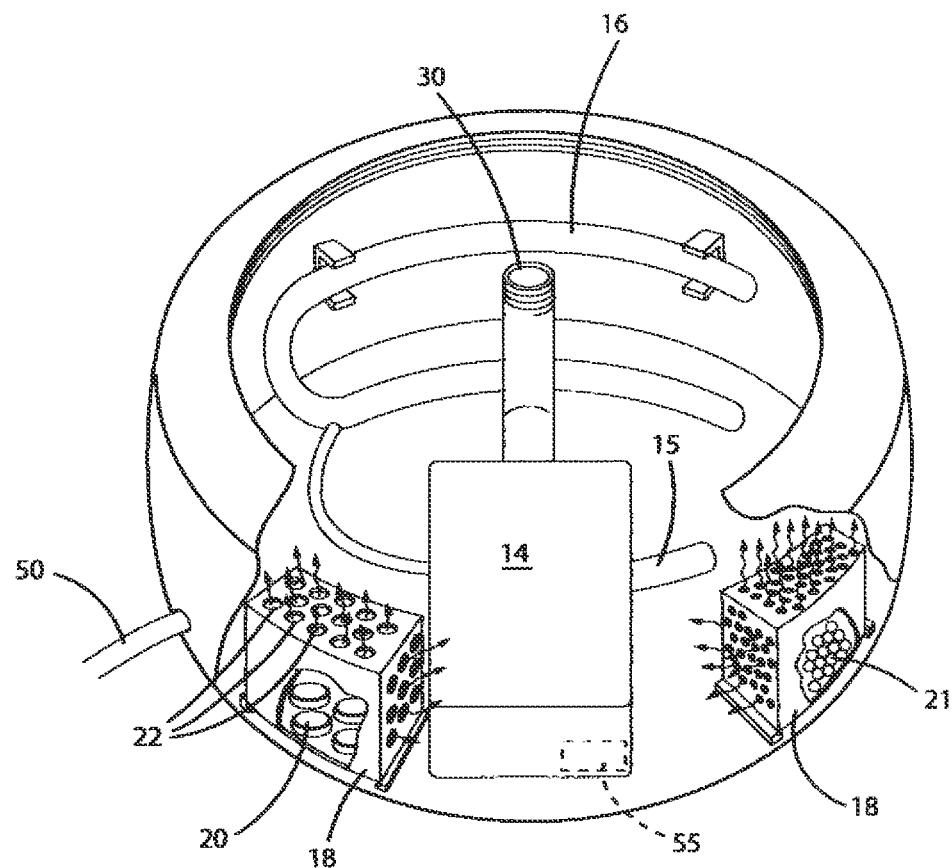
FIG. 4 is a perspective view partly in section illustrating inserts or compartments available in the housing for biocides or compositions.
Figure 5:
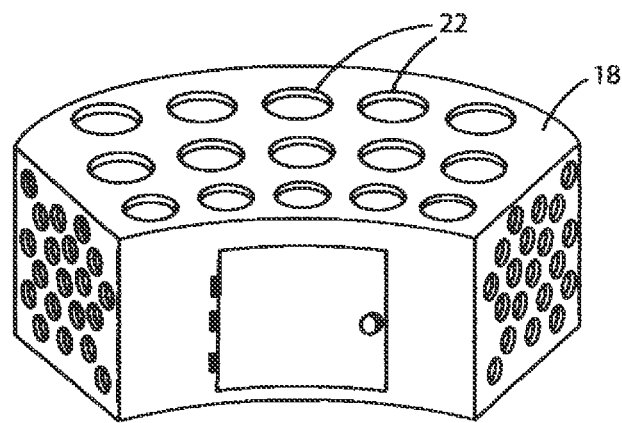
FIG. 5 is a perspective view of one of the inserts.

Referring now to FIGS. 4 and 5 livestock water introduced into dispenser 10 is designed in the preferred embodiment to circulate inside dispenser 10 by first contacting insert or component 18 and dissolve any water soluble composition 20 before it contacts variably adjustable heating element 16 which may be turned off or adjusted depending on outside temperature and the solubility properties of the composition inside insert or compartment 18. Compartment or insert may be further subdivided into a plurality of compartments or inserts to dispense a variety of types of materials and be large enough to accommodate a large quantity of barley 21 and have other inserts or compartments to accommodate small mineral tablets. As indicated in FIGS. 1B, 1C, 1D and 5 the arrangement, size and configuration of openings 22 may be varied on the perimeter of the dispenser 10 as illustrated in FIGS. 1B, 1C and 1D or disposed on the insert 18 (FIG. 1, 5) and may be selected based on opening size to control the rate of dissolution of the material inside the compartment based initially of solvency.

Figures 2, 3:
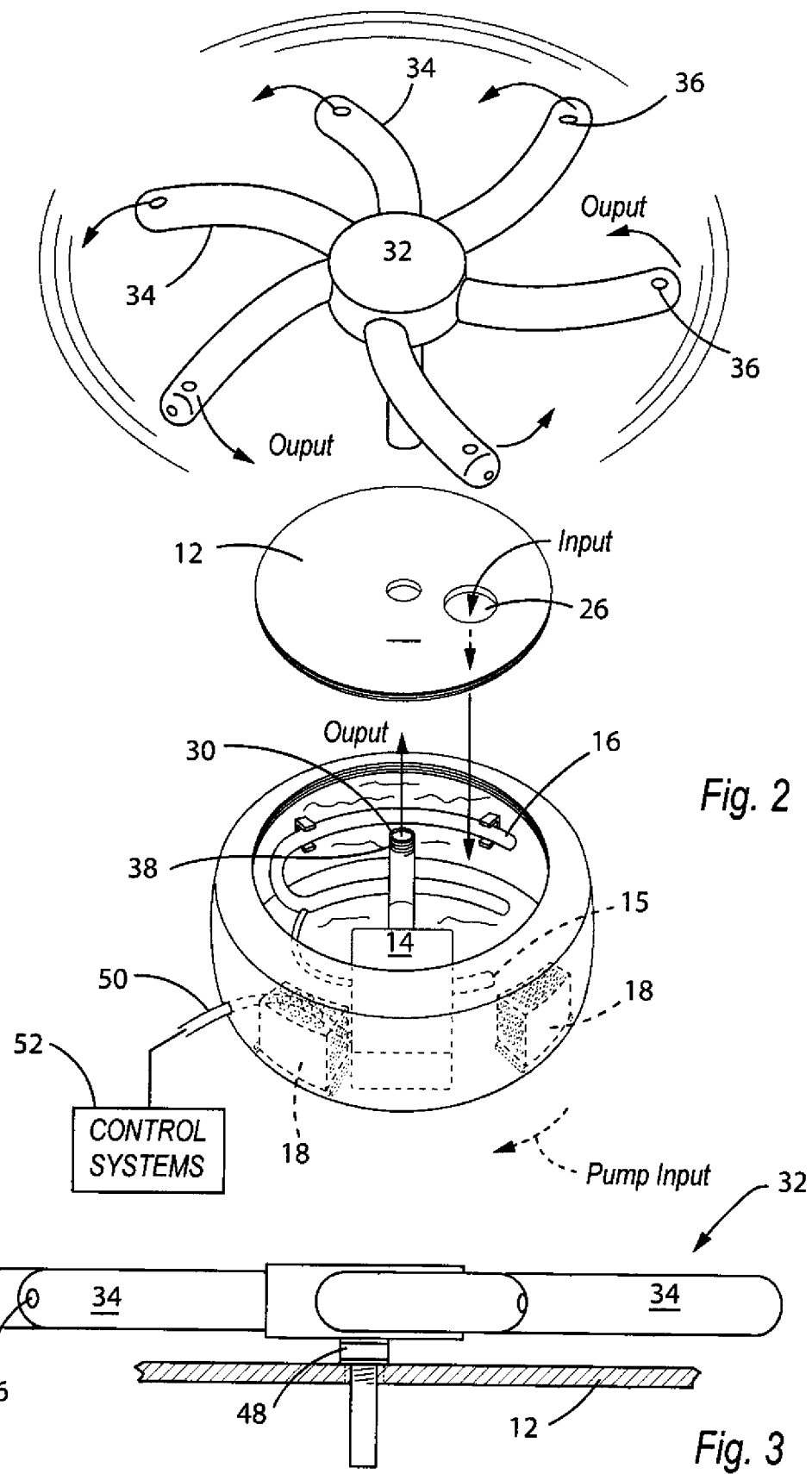
FIG. 2 is a perspective exploded alternative embodiment of the novel portable water device of FIG. 1.
FIG. 3 is a side elevational view of the alternative embodiment of the circulation device of FIG. 2.

Dispenser 10 in the FIG. 1 embodiment includes a discharge port 30 for connection to a water circulation device 32 having a plurality of arms 34 with each arm 34 terminating in a nozzle 36. The circulation device 32 may be stationary as illustrated in FIGS. 1, 1A-6, and 7 by the placement of openings 22A around the perimeter of the housing to form the circulation device 32 as illustrated in FIGS. 1B-1D. The circulation device 32 can also be rotatable with respect to the housing as illustrated in FIGS. 2 and 3 and may have threads 38 or a bayonet type fastener for removable and replaceable connection to a circulation device having a greater or lesser number of arms as well as length and configurations to accommodate seasonal as well as differences in the configuration and size of livestock tough 40 (FIG. 7).

Referring now to FIGS. 2 and 3 the length, number and shape of the arms 34 on the circulation device 32 can be modified to suit particular requirements. In addition the geometrical configuration of the arms 34 can be modified to suit particular requirements. In addition arms 34 of the circulation device can be fixed or rotate with respect to lid or cover 12 by utilizing a bearing assembly 48.

The shape and size of the insert or compartment 18 as well as its power input by wire or wireless by battery can be modified to accommodate the shape of the dispenser 10 as well as accommodating the solubility of the biocide, algicide, nutrient, mineral, medicament or other material placed in the insert by modifying the size, shape and number of holes in compartment 18. In addition the height or radial position of the compartment or insert 18 may be modified in relation to the pump pressure circulation pattern inside dispenser 10 as well as by the outside circulation pattern provided by fixed openings FIGS. 1B, 1C and 1D or rotatable arms 34 and the nozzle 36 in each of the arms 34.

Figure 6:
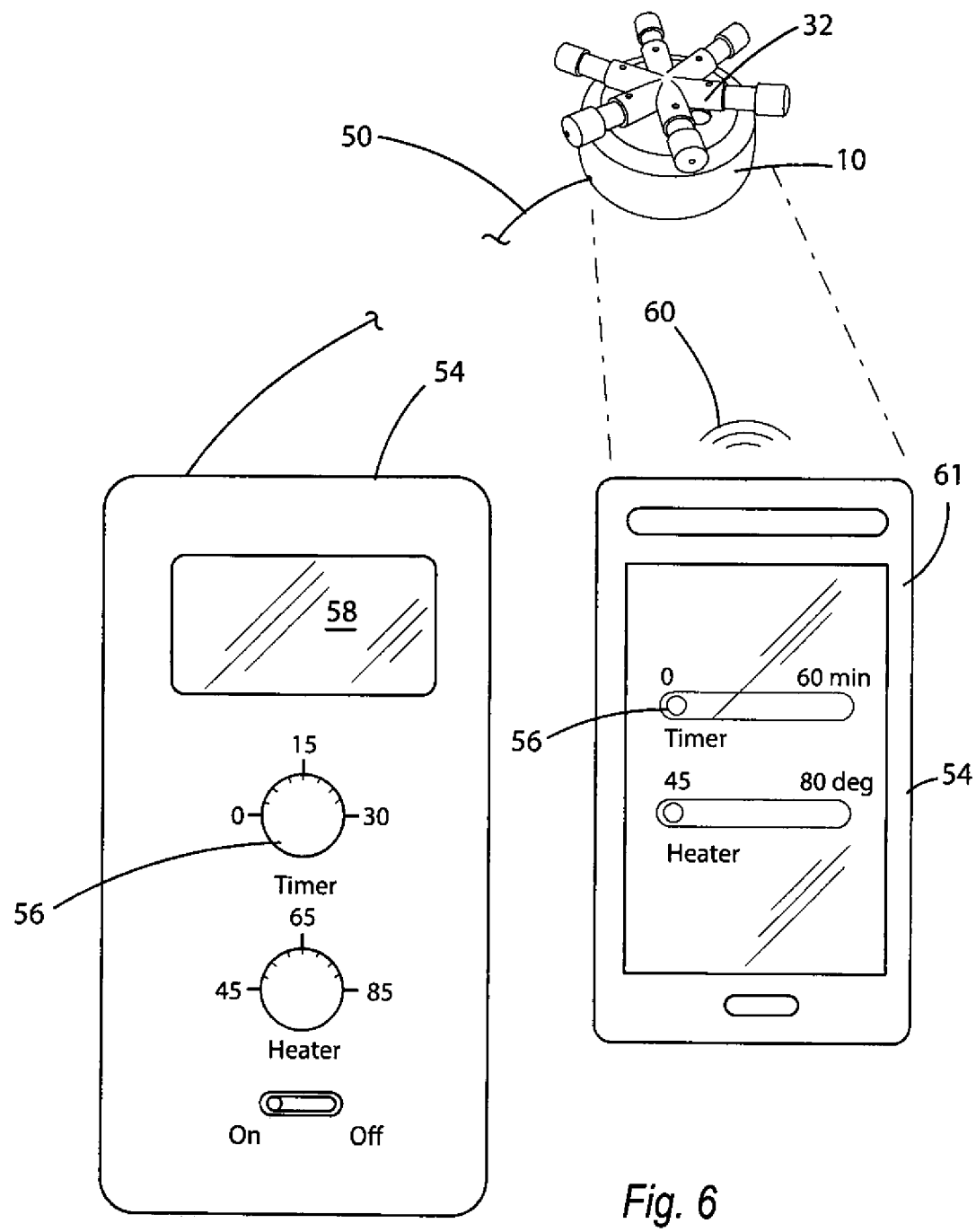
FIG. 6 is a view of a wired and wireless control of the novel portable water dispenser.
Figure 7:
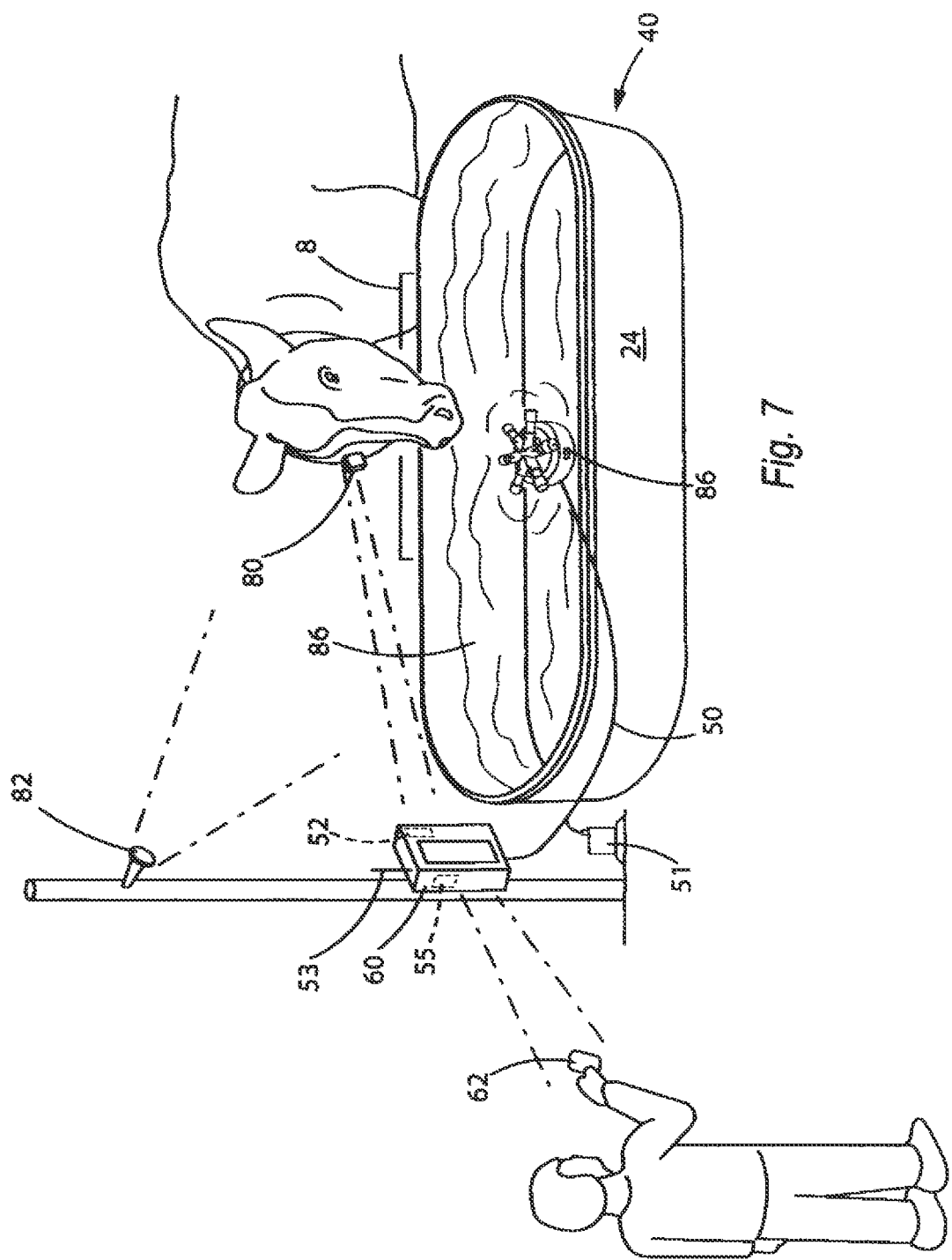
FIG. 7 is a diagrammatic view of a further embodiment of the novel portable dispenser and method of the invention.

Referring now to FIGS. 1, 2, 6 and 7 dispenser 10 in the wired embodiment includes an electrical power cord 50 connected to an AC-DC electrical system or for remote locations to a large storage battery 51 and/or electrical generation apparatus. Power cord 50 can also be connected to an electronic control system 52 which includes a computer program or software 55 and which in the preferred embodiment includes a control display 54. The computer program or software 55 can also be housed with pump 14 in a water tight case or in water tight case 14A (FIG. 1C). The display 54 may be connected to controller 52 by a wired or wireless connection through an antenna 53 (FIG. 1D) which may be connected to the display 54 or directly to the dispenser 10 (FIG. 1D) as illustrated in FIGS. 5 and 6 or through a cellphone 62. Control display 54 optionally contains a timer 56 as well as a control and display pad 58. The electronic control system 52 may also include a wireless transceiver 60 for communication and control through a communication device 61 with a cellphone 62.

In applications where a controlled dosage is required the novel device not only provides controlled dosage in the drinking water but also provides additional components and method for controlling the amount of medicament each animal receives. In such applications individual watering trough or plenum 24 can be provided for each animal with the addition of a sensor 80 and/or sensor 81 with a sensor wire to sense how long each animal drinks from plenum 24 which starts timer 56 on the wired or wireless device (FIG. 6). In the preferred embodiment a camera identifies the animal and stores an image. Once the desired quantity of water has been taken in sensor 80 or 81 can send a mild shock or sound to prevent the animal from taking more water from that particular plenum. Images of dosed animals can be stored or sent remotely to cellphone 62 so that dosed animals can be directed to other drinking trough 40 having the novel dispenser but without same medicament or composition. In addition a further sensor 86 added to either dispenser 10 or to plenum 24 to monitor the quality and concentration of the medicament in plenum 24. Controlled dispensing can also be achieved by utilizing dispensing pumps available from a number of sources such as are available from Sterner Pumps and water quality analyzers to provide real time water quality analysis can be achieved by employing a suitable water quality analyzers as are available from Eutech and various other sources.

The novel compact dispenser 10 and the precise control of the heating element 16 and pump pressure together with the nozzle size and the interchangeability of the circulation device 32 not only provides versatility for the addition of vitamins, nutrients and medicaments into the drinking water but also provides for energy efficiency. As is known to those skilled in the art moving or circulating water does not freeze as quickly as standing water. As a result the versatility in the novel dispenser allows the dispenser to be run remotely or programmed to rely on water circulation and add heat only when necessary. Conversely the control of the pump in relation to temperature allows the device to be operated at the most efficient rate to discharge biocides, nutrients, vitamins, minerals and mendicants based on animal usage.

As will be recognized by those skilled in the art the novel dispenser and method permits a broad range of change and variation such that the foregoing described embodiments and methods should be construed as illustrative only and should not be construed as limiting the appended claims.

What is claimed is:

1. An energy saving livestock water heater device to control the quality of livestock water comprising:
    (a) a self contained portable housing having a top portion, a bottom portion, an internal cavity with a water tight compartment a water intake and a discharge port;
    (b) a heating element with its electrical contacts disposed in the water tight compartment in the internal cavity of the housing;
    (c) a water permeable biocide, vitamin, mineral nutrient or medicament compartment or area disposed in the internal cavity;
    (d) a single variable pressure pump having a variable output at least partially disposed in the water tight compartment in the internal cavity of the housing;
    (e) a circulation opening in or on the housing to enable the single variable pressure pump to circulate water from the single variable pressure pump to an animal water trough and back to the single variable pressure pump;
    (f) a control system to save energy by first varying the speed or pressure output of the single variable pressure pump and then activating the heating element only when required to prevent freezing of water; and
    (g) a communications system connecting a farmer or rancher to provide precise control over the steps of varying the single variable pressure liquid pump pressure and adding heat when necessary to prevent liquid freezing.

2. The livestock water heater device of claim 1 wherein the circulation device opening is connected to a plurality of dispensing arms.

3. The livestock water heater device of claim 2 wherein the plurality of dispensing arms are curved.

4. The livestock water heater device of claim 2 wherein the plurality of dispensing arms are rotatable with respect to the housing.

5. The livestock water heater device of claim 1 further comprising a transceiver disposed in the water tight compartment.

6. The livestock water heater device of claim 1 wherein the water permeable compartment accommodates biocides, minerals, vitamins, nutrients and medicaments.

7. The livestock water heater device of claim 1 further comprising an electrical outlet to connect to an external battery or generator.

8. The livestock water heater device of claim 1 further comprising a monitoring device to monitor water quality, water composition and/or controlling the amount of medicament consumed by each animal.

9. A method of dispensing a liquid to animals comprising:
    (a) utilizing a water circulation device that includes a housing and a single variable pressure liquid pump and a heater;
    (b) varying the single variable pressure liquid pump pressure and water circulation without spraying to increase liquid flow rate to prevent liquid freezing;
    (c) adding heat when necessary to prevent liquid freezing;
    (d) supplying a biocide, algicide, nutrient, mineral, vitamin or medicament to the liquid;
    (e) using a computer program to control the pressure of the single variable pressure liquid pump and if necessary increase temperature to prevent freezing and provide a circulation of water to provide a controlled release of the biocide, algicide, nutrient, mineral, vitamin or medicament;
    (f) having a communications system connecting a farmer or rancher to provide precise control over the steps of varying the single variable pressure liquid pump pressure and adding heat when necessary to prevent liquid freezing.

10. The method of dispensing a liquid to animals of claim 9 further comprising the step of providing an insert with one or more openings of a shape or size that assist in controlling the concentration of the biocide, algicide, nutrient, mineral, vitamin or medicine in the liquid.

11. The method of claim 10 wherein the heater has a variable temperature control.

12. The method of dispensing a liquid to animals of claim 9 further comprising a monitoring system to monitor the quantity of mineral, vitamin or medicine received by each animal.

13. The method of dispensing a liquid to animals of claim 9 further comprising a wireless bi-directional communications link between the water circulation device and a farmer, rancher or animal owner.

14. The method of dispensing a liquid to animals of claim 9 further comprising the step of monitoring the quality of the liquid.

15. An energy saving apparatus for dispensing a liquid in a remote water reservoir comprising:
    (a) a submersible housing having a liquid intake, a discharge port, a water tight compartment and a water permeable compartment;
    (b) a single variable pressure pump and a variable temperature heating element disposed in the water tight compartment;
    (c) a processor to vary a variable pump pressure of the variable pressure pump and the variable heating element in response to a water quality variable in the remote water reservoir;
    (d) a software program to first vary the single variable pressure pump and then add heat when required to save energy and prevent water freezing or assist in the controlled release of vitamins, minerals or therapeutic agents; and (e) a sensor to sense how long each animal drinks from the remote water reservoir and a device to prevent an animal from taking more water from the remote water reservoir.

16. The apparatus for dispensing a liquid of claim 15 further comprising a two-way communications link between the apparatus and a farmer or rancher to provide an immediate control/response to change water quality, water composition and/or water temperature.

17. The apparatus for dispensing a liquid of claim 15 further comprising a transceiver.

18. The apparatus for dispensing a liquid of claim 15 further comprising an electrical connection for an external battery.

19. The apparatus for dispensing a liquid of claim 15 further comprising a monitor to control the amount of vitamins, minerals, nutrients and medicaments consumed by an animal.

20. The apparatus for dispensing a liquid of claim 15 further comprising a camera and a two-way communications link disposed between the apparatus and a farmer, rancher or monitor and wherein the single variable pressure pump has a variable output of about 300 to 1,000 gallons per hour.

\* \* \* \* \*